US007813979B2

(12) United States Patent
Poetzsch (10) Patent No.: US 7,813,979 B2
(45) Date of Patent: Oct. 12, 2010

(54) METHOD AND SYSTEM FOR AVERAGE SPOT BASKET PRICING OPTIONS WITH ARBITRARY FIXING SCHEDULES AND WITH WEIGHTING FACTORS

(75) Inventor: Reinhard H. H. Poetzsch, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 1406 days.

(21) Appl. No.: 11/031,079

(22) Filed: Jan. 10, 2005

(65) Prior Publication Data
US 2005/0222939 A1 Oct. 6, 2005

Related U.S. Application Data

(63) Continuation-in-part of application No. 10/812,055, filed on Mar. 30, 2004.

(51) Int. Cl.
*G06Q 40/00* (2006.01)
(52) U.S. Cl. .................. 705/35; 705/36; 705/1
(58) Field of Classification Search .................. 705/35, 705/1, 36, 37, 10, 7, 2, 4, 400; 706/50, 13; 273/402
See application file for complete search history.

(56) References Cited

U.S. PATENT DOCUMENTS

| | | | | |
|---|---|---|---|---|
| 6,173,276 | B1* | 1/2001 | Kant et al. | 706/50 |
| 6,546,375 | B1* | 4/2003 | Pang et al. | 705/37 |
| 2002/0120542 | A1* | 8/2002 | Higgins | 705/36 |
| 2002/0178101 | A1* | 11/2002 | Swift | 705/36 |
| 2003/0014337 | A1* | 1/2003 | Mathews et al. | 705/35 |
| 2003/0208430 | A1* | 11/2003 | Gershon | 705/36 |

OTHER PUBLICATIONS

Castellacci and Siclair, Asian Basket Spreads and Other Exotic Averaging Options, Energy Power Risk Management, 2003.*
Datey, Gauthier and Simonato, The Performance of Analytical Approximations for the Computation of Asian Quanto-Basket Option Prices, 2003, Multinational Finance Journal, vol. 7, No. 1 & 2 pp. 55-82.*
"Guide to . . . Foreign Exchange" By: Ernesto B. Calucage, Publisher: Business World (Philippines), Apr. 15, 2005.*
John C. Hull, Options, Futures and Other Derivatives, 2006, Sixth Edition, 789 pgs. Pearson Prentice Hall.
Israel Nelken, The Handbook of Exotic Options: Instruments, Analysis, and Applications, 1996, 362 pgs. Times Mirror Higher Education Group.

* cited by examiner

*Primary Examiner*—Mary Cheung
*Assistant Examiner*—John H Holly
(74) *Attorney, Agent, or Firm*—Kenyon & Kenyon LLP (57) ABSTRACT

Methods and systems of calculating a net present value ("NPV") of an average spot basket option are provided. One method includes reading an evaluation date, contract data and market data associated with a basket, and calculating net present value of the average spot basket option by applying Black-Scholes theory to the sum of spot prices of the underlying assets of the basket, wherein the sum of spot prices of the underlying assets of the basket is represented as a single underlying asset. Another method includes calculating first and second moments of a sum of weighted spot price values of underlying assets of a basket and applying Black-Scholes theory using these moments to calculate NPV. Another method includes calculating a NPV according to a set of equations and displaying the calculated NPV. A system includes a memory and a processor that executes code to in accordance with the methods described herein.

9 Claims, 5 Drawing Sheets

METHOD AND SYSTEM FOR AVERAGE SPOT BASKET PRICING OPTIONS WITH ARBITRARY FIXING SCHEDULES AND WITH WEIGHTING FACTORS

This application is a continuation-in-part of copending U.S. patent application Ser. No. 10/812,055, filed Mar. 30, 2004, titled "Method and System for Derivatives Pricing," and incorporated herein by reference in its entirety.

FIELD OF THE INVENTION

The invention relates a method and system for approximate pricing of average spot basket options, the method and system having an ability to use arbitrary fixing schedules and/or weighting factors for each underlying asset as well as an ability to use non-equidistant fixing instants within a given fixing schedule.

BACKGROUND

An "option" is understood to be a contract that gives a buyer a right, but not an obligation, to buy or sell an underlying asset at a specific price on or before a certain date. An option pricing formula, known as the Black-Scholes option pricing formula, provides a theoretically consistent framework for pricing options. Option pricing theory is also known as Black-Scholes theory or derivatives pricing theory.

There are basically two types of options: calls and puts. A call gives a holder a right to buy an asset at a certain price within a specific period of time. A put gives a holder a right to sell an asset at a certain price within a specific period of time. Entities that buy options are called holders and those who sell options are called writers. Based on the two types of options and the two types of entities that trade in options, there are a total of four types of participants in the options markets: buyers of calls, sellers of calls, buyers of puts, and sellers of puts.

The price at which an underlying asset can be purchased or sold, according to the terms of the option, is called the "strike price." This is the price an asset must go above (for calls) or go below (for puts) before a position can be exercised. The strike price is distinguished from the "spot price," which is a current price at which a particular asset can be bought or sold at a specified time and place.

There are two classes of options: American and European. The classes are based on when an exercise can occur. An American option can be exercised at any time between its date of purchase and its expiration date. A European option can only be exercised at the end of its life. An option is worthless after its expiry or exercise date has passed. This holds true for both American and European options.

The calls and puts described above may be referred to as "plain vanilla" options. Plain vanilla options can be identified as standard options. There are, however, many different types and variations of options. Non-standard options are often called "exotic options." Exotic options may use variations on payoff profiles of plain vanilla options or may differ in other respects from plain vanilla options. Exotic options may also include completely different products that nonetheless carry some type of option ability.

A "basket option" is one type of exotic option. In contrast to a plain vanilla option, the underlying asset of a basket option may consist of a number of assets. That is, $N_A \geq 1$, where $N_A$ is the number of underlying assets of a basket option. Accordingly, a basket spot price is the sum of the spot prices of each individual asset. The underlying assets may be, for example, commodities, securities, or currencies. This list of possible underlying assets is not meant to be exclusive, but rather exemplary.

A calculation of a fair market value of an exotic option, such as a typical basket option, is a computationally complex task that presently, using known tools and methods such as Monte Carlo analysis, can take several hours using a personal computer. In financial analysis systems, such time intensive calculations typically have been performed periodically, for example, in a "back office area" of a banking organization.

In order to evaluate a Basket Option ("BO") or an Average Spot Option ("ASpO") there are two main approaches: analytical approximate approaches (using "closed form" nearby solutions) and Monte Carlo based ones (performing numerical simulations). An Average Spot Basket Option ("ASpBO") can be evaluated by Monte Carlo (e.g., using the finance tool FinCad®) or by sequentially applying an analytical approximation for BO and an analytical approximation for ASpO. However, sequential application of a BO and an ASpO method in order to evaluate ASpBO neglects the correlation between spot prices of distinct underlying assets at distinct instants resulting in restricted accuracy. What is needed is a method to quickly and accurately evaluate a fair value, or approximation of a fair value, of exotic options, such as basket options that includes the effect of the correlation between spot prices of distinct underlying assets at distinct instants. It is also desirable to have a system, incorporating the desired method, which can be implemented on personal computers, which can provide accurate results in near real-time, or within a fraction of the time now taken by standard methods, such as Monte Carlo analyses.

BRIEF DESCRIPTION OF THE DRAWINGS

The various features of the invention will best be appreciated by simultaneous reference to the description which follows and the accompanying drawings, wherein like numerals indicate like elements, and in which.

DETAILED DESCRIPTION OF AN EMBODIMENT OF THE INVENTION

Methods and systems are presented herein to quickly and accurately evaluate net present value ("NPV") and related key figures of exotic options that include the effect of a correlation between spot prices of distinct underlying assets at distinct instants. The method is comprehensive in its scope as it allows for, but does not require, arbitrary fixing schedules and weighting factors to be applied to each underlying asset. The fixing schedule may define fixing instants (e.g., dates and times) upon which the spot rate is taken and fixed. The fixing instants may be equidistant or non-equidistant within a given fixing schedule. Two parties entering into a contract may define the fixing schedules. Fixing schedules may be entered into a table for use by the method described herein. Averaging of underlying assets may be performed arithmetically and with possibly different weights. The method (an analytical approximative approach, i.e., a "closed form" nearby solution) described in embodiments herein may be able to quickly calculate NPV and related key figures in comparison to the time required to calculate similar values using common Monte Carlo based methods, while still providing comparable accuracy of the results. It is believed that accuracy of 10 basis points, or ±0.1% or better can be achieved.

For purposes of example, consider an exotic option known as an "Asian Basket Option." An "Asian Option" is an option whose payoff depends on the average price of the underlying asset over a certain period of time. This type of option may also be known as an average option. An Asian Basket Option, by extension, may be considered as an option whose payoff depends on the average price of the sum of the individual spot prices of each underlying asset in the "basket" over a certain period of time. The term Asian (basket) option includes two variants: average spot (basket) option and average strike (basket) option. While the embodiment described herein may be used for average spot (basket) options, the method may also be extended/generalized for use with average strike (basket) options.

Exotic options, like ASpBO, ASpO, and BO may be relevant, for example, to companies that want to hedge their foreign exchange transactions against market risks or energy providers that may want to hedge against weather risks. The underlying assets could be any stochastic processes, like, for example, outside temperature or rainfall. All lists recited herein are meant to be exemplary and not exclusive.

Description of an Average Spot Basket Option

A payoff of an ASpBO may be calculated on a basis of an average of the sum of the averaged basket spot prices, instead of on a basis of the current basket spot price. The samples for the average are taken at a given set of instants, $t_1^{(j)}, t_2^{(j)}, \ldots, t_{N_j}^{(j)}$, where $N_j$ is an integer value equal to or greater than 1. The instants may be any unit measure of time, such as, for example, minutes, hours, days, or weeks. There may be an individual schedule for each one of the underlying assets j, where j=1, 2, . . . , $N_A$. The instants may be non-equidistant within a given schedule.

As described herein, the averaging (of the average basket spot price) may be done arithmetically and with possibly differing weights $w_i^{(j)}$. Explicitly, a payoff, for call or put, may be written as:

$$payoff_{call/put} = \text{Max}\left\{0, +/-\left(\sum_{j=1}^{N_A}\sum_{i=1}^{N_j} w_i^{(j)} S_j(t_i^{(j)}) - K\right)\right\}$$ Eqn. 1 where, $$\sum_{i=1}^{N_j} w_i^{(j)} = 1 \text{ for all } j=1, \ldots, N_A.$$ Eqn. 1A and where, the plus sign in front of the inner bracket in Eqn. 1 is valid for call options and the minus sign is valid for put options. The quantity $w_i^{(j)}$ is the i-th weighting factor of the j-th asset. The quantity $S_j(t_i^{(j)})$ is the spot price value of the j-th asset at time $t_i^{(j)}$. The quantity K is the strike price. Note that in Eqn. 1, division by the number of spot prices of each asset summed is implicitly contained in the weighting factors. See Eqn. 1A.

In the formula of Eqn. 1, for the particular case of $N_A=1$, the ASpBO is an average spot option ("ASpO"). In the particular case of $N_j=1$ for j=1, . . . , $N_A$ there is no averaging, therefore the ASpBO is a plain basket option ("BO"). Accordingly, for $N_A=1$ and N=1, solving Eqn. 1 results in a plain vanilla option. The method of evaluating NPV disclosed herein is also valid for $N_A=1$ and $N_j=1$. Therefore, the method disclosed herein can be used to evaluate both plain vanilla and exotic options. It will be understood that the value payoff$_{call/put}$ of Eqn. 1 provides a value of an option at its expiration date. Values $V_{CALL}$, $V_{PUT}$, $V_{CALL/PUT}$ of Eqn. 2, which appear below, are the discounted expectation values of the payoff at an arbitrary point in time. The arbitrary point in time may or may not be one of the fixing instants.

Dates Related to an Average Spot Basket Option and its Evaluation

For an ASpBO, certain dates may be defined for use in an evaluation of its NPV. In embodiments described herein, the term "evaluation date" refers to a date for selecting the market and contract data and is also the date for which the NPV will be calculated. In some embodiments, the evaluation date may be the date for selecting the market and contract data, while another date, referred to as a horizon date, is the date for which the NPV will be evaluated. Market data may include, for example, interest rates, volatilities, correlations, current values of spot prices as quoted on various stock markets, and other data as known to those of skill in the art. In some embodiments, the minimum market data needed may be the spot price value for each underlying asset valid at the evaluation date, the interest rate curve of the contract currency, one volatility for each underlying asset, and also the correlation between all the underlying assets. Contract data may include, for example, the expiration date of the options and the identities of the underlying assets (e.g., underlying assets can be stocks, foreign exchanges, or anything that can be exchanged), the amounts of each underlying asset, whether there is a call or a put on the basket of underlying assets, the strike price of the underlying assets (the price to be paid or received on exercise), a timetable or schedule as to when the spot price values should be fixed in order to get their average (hereinafter referred to as a "fixing schedule"), and/or weighting factors for one or more assets in the basket. In some embodiments, the minimum contract data may be the identities of the underlying assets, their amounts, whether there is a call or a put on the basket of underlying assets, the strike price of the underlying assets, a fixing schedule, and/or weighting factors for one or more assets in the basket. Furthermore, it may be advisable for both parties to the exchange to specify a basis on which to fix the spot prices (e.g., the last quotation or the first quotation of a certain day).

Assumptions for Mathematical Calculations

The following assumptions may be implemented during evaluation of an ASpBO in accordance with some embodiments of the invention:

1) Averaging is done at certain instants for each asset according to the asset's schedule $t_i^{(j)}$, i=1, . . . , $N_j$ (discrete averaging); j=1, 2, . . . , $N_A$.
2) For the sake of calculating the first and second distribution moments (referred to herein as "the first moment" and "the second moment," respectively) (see Eqns. 7 and 8, infra, respectively), averaging instants need not be equidistant.
3) Only European style options are treated. American options cannot be evaluated using the formula of Eqn. 2.

4) A matrix formed by the correlation coefficients is positively semi-definite. (This is a general expectation because all correlation matrices must be positively definite. If the product of a vector multiplied by a matrix multiplied by the same vector is greater than zero then it is positively definite, if the product can be zero then the matrix is positively semi-definite.)
5) Usually, the spot prices for dates $t_i < t_E$ prior to the evaluation date are fixed. Nevertheless, it is desirable to have error robustness in case values of spot prices that should have been fixed are missing. Then, the method described herein can implicitly appreciate the missing fixed spot prices by "backward" valuation. The term "backward" valuation is meant as opposite to the usual calculation of forward spot prices.

Evaluation of an NPV of an ASPBO

Figure 1:
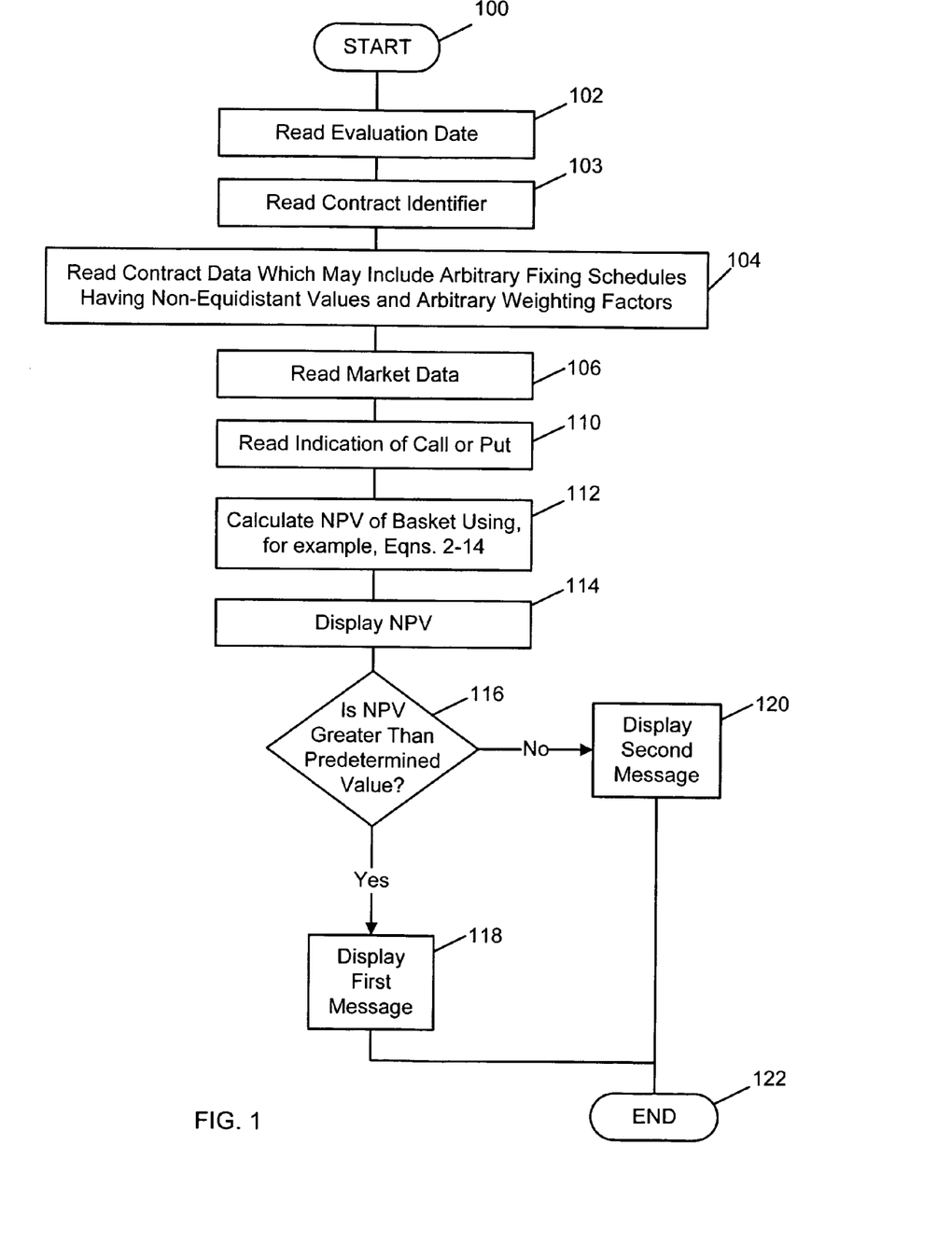
FIG. 1 is a flow diagram of a method in accordance with an embodiment of the invention.
Figure 3:
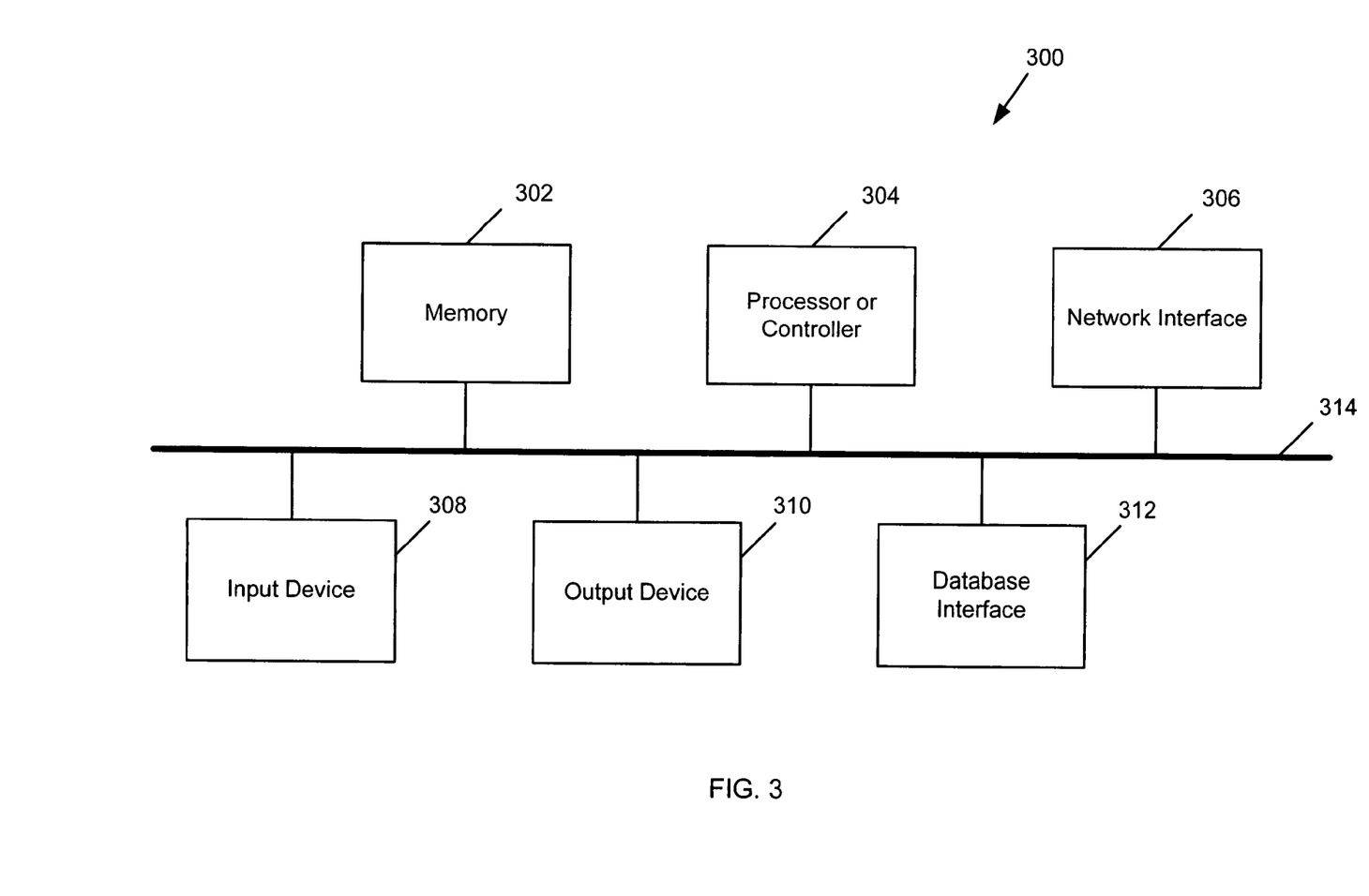
FIG. 3 illustrates an exemplary embodiment of a derivatives pricing system in accordance with an embodiment of the invention.

Referring now in detail to the drawings, there is illustrated in FIG. 1 a flow diagram of a method in accordance with an embodiment of the invention. The method begins at step 100. At step 102, an evaluation date for selecting market data may be acquired. At step 103, an identification of a contract concerning the basket to be evaluated may be acquired. At step 104, contract data associated with the identified contract may be acquired. In some embodiments, the contract data may include the identities of the underlying assets, their amounts, whether there is a call or a put on the basket of underlying assets, the strike price of the underlying assets (the price to be paid or received on exercise), a fixing schedule, and/or weighting factors for one or more assets in the basket. The fixing schedules, and/or weighting factors, may be arbitrary. At step 106, with knowledge of at least the evaluation date, the market data for the set of assets belonging to the basket may be acquired. At step 110, an indication of whether the NPV is calculated for a call or a put may be acquired. The data for steps 100-110 may be acquired, for example, from a memory 302 (FIG. 3). Data may be input via a manual entry device, such as a keyboard, in response, for example, to a prompt issued to a user. Furthermore, it will be understood that any data read from a memory could, alternatively, be stored in a database (similar to 412, 414, FIG. 4), or other any other data storage devices or systems know to those of skill in the art, without departing from the scope of the invention.

It will be further recognized that market data and/or contract data may have been previously stored in the memory as a result of, for example, another process that collects and updates these parameters. It is still further recognized that, in the examples provided herein, while a single memory is described, the market and contract data may reside in separate memories or be retrieved from separate systems without departing from the scope of the invention. Additionally, it will be recognized that some portion of the data may have been predetermined or may have been previously fixed by some other application.

At step 112, the NPV of the basket may be calculated, for example, as set forth in Equations 2-11. It will be understood that the abbreviation "NPV" is synonymous with $V_{CALL}$, $V_{PUT}$, or $V_{CALL/PUT}$.

$$\left. \begin{array}{l} V_{call}(t_E) = e^{-r(t_E,T)(T-t_E)}\left[+\tilde{F}N(+\tilde{d}_1) - \tilde{K}N(+\tilde{d}_2)\right] \\ V_{put}(t_E) = e^{-r(t_E,T)(T-t_E)}\left[-\tilde{F}N(-\tilde{d}_1) + \tilde{K}N(-\tilde{d}_2)\right] \end{array} \right\} \text{ for } t_E \leq T \text{ and } \tilde{K} > 0$$

$$\left. \begin{array}{l} V_{call}(t_E) = e^{-r(t_E,T)(T-t_E)}\left[+\tilde{F} - \tilde{K}\right] \\ V_{put}(t_E) = 0 \end{array} \right\} \text{ for } t_E \leq T \text{ and } \tilde{K} \leq 0$$

$$V_{call/put}(t_E) = 0, \quad \text{for } t_E > T \qquad \text{Eqn. 2}$$

where $$\tilde{d}_1 = \frac{\ln\frac{\tilde{F}}{\tilde{K}}}{v} + \frac{v}{2}, \tilde{d}_2 = \tilde{d}_1 - v \qquad \text{Eqn. 3}$$

$$\tilde{K} = K - \sum_{j=1}^{N_A} \sum_{i=1}^{N_j} \left(1 - \delta_i^{(j)}\right) \times w_i^{(j)} S_j\left(t_i^{(j)}\right), \qquad \text{Eqn. 4}$$

where $\delta_i^{(j)} = \begin{cases} 0, & \text{if } S_j t_i^{(j)} \text{ is already fixed} \\ 1, & \text{if } S_j t_i^{(j)} \text{ is not yet fixed} \end{cases}$ $$\tilde{F} = \langle M \rangle \qquad \text{Eqn. 5}$$

$$v^2 = \ln\langle M^2 \rangle - 2\ln\langle M \rangle \qquad \text{Eqn. 6}$$

$$\langle M \rangle = \sum_{j=1}^{N_A} S_j(t_E) \sum_{i=1}^{N_j} \delta_i^{(j)} \times w_i^{(j)} e^{g_j\left(t_i^{(j)} - t_E\right)} \qquad \text{Eqn. 7}$$

$$\langle M^2 \rangle = \sum_{j=1}^{N_A} \sum_{j'=1}^{N_A} S_j(t_E) S_{j'}(t_E) \sum_{jj'} \qquad \text{Eqn. 8}$$

$$\sum_{jj'} = \sum_{i=1}^{N_i} \delta_i^{(j)} \times w_i^{(j)} e^{g_j\left(t_i^{(j)} - t_E\right)} \times \sum_{i'=1}^{N_{j'}} \delta_{i'}^{(j')} \times w_{i'}^{(j')} e^{g_{j'}\left(t_{i'}^{(j')} - t_E\right)} \times e^{\rho_{jj'} \sigma_j \sigma_{j'} \tau_{ii'}^{(jj')}} \qquad \text{Eqn. 9}$$

-continued $$g_j = r(t_E, T) - q_j(t_E, T), j = 1, \ldots, N_A \qquad \text{Eqn. 10}$$

$$\tau_{ii'}^{(jj')} = \begin{cases} 0, & \text{if } (t_i^{(j)} - t_E) \times (t_{i'}^{(j')} - t_E) < 0 \\ \text{Min}\{\text{Abs}(t_i^{(j)} - t_E), \text{Abs}(t_{i'}^{(j')} - t_E)\}, & \text{else} \end{cases}$$

where:
N(x) represents a normal cumulative distribution;
$r(t_1, t_2)$ represents a riskless domestic currency interest rate for the time span $t_1, \ldots t_2$;
$q_j(t_1, t_2)$ represents a dividend rate, or foreign currency interest rate for the time span $t_1 \ldots t_2$;
$S_j(t)$ represents a spot price of the j-th underlying asset, j= 1 . . . $N_A$;
$\sigma_j$ represents a volatility of the j-th underlying asset;
$\rho_{jj'}$ represents a correlation coefficient between the assets j and j' (the correlation is related to the logarithm of the asset prices);
K represents a strike price;
$t_E$ represents an evaluation date (unit of measure is year);

$$T = \text{Max}_{i,j}\{t_i^{(j)}\}$$

represents the latest fixing instant, i.e., the maturity at option; and
$w_i^{(j)}$ represents a i-th weighting factor of j-th asset.

In the foregoing, $e^{-r(t_E,T)(T-t_E)}$ may be considered as a discounting factor for a time span from $t_E$ to T. Furthermore, $\tilde{F}$, $N(+\tilde{d}_1)$, $N(+\tilde{d}_2)$, and $\tilde{K}$ may respectively represent a modified forward spot price for all underlying assets, a modified normal cumulative distribution function of $\tilde{d}_1$ and $\tilde{d}_2$, respectively, and a modified strike value, wherein the modification is over that of the Black-Scholes theory as conventionally used by those in the art. Additionally, it will be understood that once the first moment, <M>, and the second moment <$M^2$>, respectively, are determined using, for example, Eqns. 7 and 8, respectively, then the variance of distribution at the time of maturity, $v^2$, may be determined, using, for example, Eqn. 6. Furthermore, the modified strike value, $\tilde{K}$, can be determined, for example, by using Eqn. 4. The values of $d_1$ and $d_2$ may be determined, for example, using Eqn. 3. These modified values may be applied to Eqn. 2, in accordance with the invention disclosed herein, to determine an NPV of an average spot basket option.

At step 114 the calculated NPV may be displayed. NPV may be used to calculate risk key figures, such as, for example, value at risk or sensitivity to market fluctuations. One could also calculate a hypothetical price on an assumption of certain market conditions. Other uses of NPV are known by those of skill in the art.

In one embodiment, at step 116, the calculated NPV may be compared to a predetermined value. If the NPV is greater than the predetermined value then, at step 1118, a first message may be displayed, for example on output device 310 (FIG. 3). If the NPV is less than the predetermined value then, at step 120, a second message may be displayed, for example on output device 310 (FIG. 3). The method may end at step 122, following either steps 118 or 120. In some embodiments, users may implement the display of first and second messages to issue commands for buying or selling. The first and second messages may, for example, be instructions to an analyst to execute a trade, to vary input data, to postpone a trade, to request new market and/or contract data, or to vary or otherwise alter the content of the basket. In some embodiments, the difference between the NPV and the predetermined value may be used to providing indications of degrees of warning or caution. These indications may be provided by, for example, display on an output device. In some embodiments, the difference between the NPV and the predetermined value may be used to automatically execute buying or selling of baskets. The preceding list is meant to be exemplary and in no way limiting.

The predetermined value may be assigned based on, for example, a hypothesis or assumption of how much a given transaction should cost. A description of an exemplary hypothesis or assumption of how much a given transaction should cost is too complex to describe herein. Such hypotheses or assumptions, however, are readily within the grasp of those of skill in the art. In the financial industries sector in general and among financial engineers in particular, a hypothesis or assumption may be the result of both qualitative and quantitative metrics and may incorporate personal or collective insights that were gained, for example, by experience in the art. Nonetheless, those of skill in the art are capable of making such hypotheses or assumptions and are therefore capable of determining the predetermined value.

The NPV formula expressed by Eqn. 2, above, may be used for the purchase of an ASpBO. In the case of selling the ASpBO, the sign of the NPV must be changed.

In the NPV formula expressed by Eqn. 2, above, the rates r and $q_j$ may be continuously compounded rates. In some embodiments, $r(t_E, T)$ in the discounting factor in the equations may be replaced by the forward rate $r(t_H, T)$ in order to get the option prices related to the horizon date $t_H$. In such embodiments, $e^{-r(t_H,T)(T-t_H)}$ may be considered as the discounting factor.

Those of skill in the art will appreciate that in the instance where the underlying assets are foreign exchanges, r may be the riskless interest rate of the domestic currency and $q_j$ may be the riskless interest rate of the foreign currency j. Accordingly, the spot price $S_j(t_E)$ may be the amount in domestic currency arising from the foreign currency amount to pay/receive on the option maturity T multiplied by the foreign-to-domestic-exchange rate valid at $t_E$.

If the modified strike $\tilde{K}$ becomes negative, then the payoff $\text{Max}[0, \pm(\tilde{F}-\tilde{K})]$ is no longer a function exhibiting a non-analytical cut-off. Instead, the payoff may be expressed as $\tilde{F}-\tilde{K}$ for a call, or zero for a put.

In some embodiments, the following contract data and other fixed data may be applied as input data:

| Contract Data and Other Fixed Data | Description |
|---|---|
| option type | put or call |
| $N_j$, j = 1, 2, . . ., $N_A$ | number of averaging samples (i.e., the number of averaging instants) |

-continued

| Contract Data and Other Fixed Data | Description |
|---|---|
| $A(t_E)$ | average value of fixed spot prices: $$A(t_E) = \sum_{j=1}^{N_A} \sum_{i=1}^{N_j} \left(1 - \delta_i^{(j)}\right) \times w_i^{(j)} S_j(t_i^{(j)}),$$ the fixed spot price values $S_j(t_i^{(j)})$ are not required to be known explicitly, for the sake of evaluation it is sufficient to know the average |
| $T = \underset{i,j}{\text{Max}}\{t_i^{(j)}\}$ | maturity, averaging end date |
| K | strike price |
| Fixing Schedules | provides tables of fixing points, either equidistant or non-equidistant, for each underlying asset. |

In some embodiments, the following market data may be applied:

| Market Data | Description |
|---|---|
| $S_j(t_E)$ | current spot prices |
| $r(t_E, T)$ | riskless interest rate for the time span $t_E \ldots T$ |
| $q_j(t_E, T)$ | dividend rate for the time span $t_E \ldots T$ |
| $\sigma_j = \sigma_j(t_E)$ | current implied Black-Scholes volatility for the plain underlying asset j (underlying asset without averaging) |
| $\rho_{jk}$ | correlation coefficients |

The formula of Eqn. 2, used in the method disclosed hereinabove, is derived originally from an analytical approach to evaluate Average Spot Options (ASpO). That analytical approach is generalized to an evaluation of Average Spot Basket Options (ASpBO). The analytical approach is known to those in the art as a "Levy approximation." With the generalized Levy approximation, as expressed by the formula of Eqn. 2, it is not only possible to evaluate ASpBO but also to evaluate the particular cases of:

Case 1—Equidistant fixing instants, which are the same for all underlying assets:
  $t_i^{(j)} = t_i^{(j')}$ for all j, j' and i. Moreover, weights are all of the same value:
  $w_i^{(j)} = w_{i'}^{(j')} = 1/N_j = 1/N_{j'} = 1/N_{j'}$ for all j, j', i and i'.
  Under the prerequisites of Case 1, the calculations of NPV and related key figures become less laborious. This case is described in co-pending U.S. patent application Ser. No. 10/812,055, filed Mar. 30, 2004, and incorporated herein by reference in its entirety.

Case 2—Prerequisites of Case 1 together with $N_A=1$, i.e., there is only one underlying asset.
  Under the prerequisites of Case 2, the ASpBO is actually an average spot option and the formulas become equivalent to those of the so-called "Levy-Approximation."

Case 3—Prerequisites of Case 1 together with $N_1 = N_2 = \ldots = N_{N_A} = 1$, i.e., there is no averaging—for each underlying asset, the fixing schedule contains only one fixing date.
  Under the prerequisites of Case 3, the ASpBO is actually a basket option. Then the formulas become equivalent to an approach, which can be found in textbooks (e.g., John Hull: Options, Futures and Other Derivatives).

Case 4—an ASpBO with only one underlying asset, i.e., actually an ASpO.

Case 5—an ASpBO with only one averaging date, i.e., actually a plain Basket Option (BO) without averaging.

Case 6—an ASpBO with only one underlying asset and one averaging date, i.e., actually a standard option, also known as a plain vanilla option.

Because the method disclosed herein is an analytical one, it is much faster than a statistical approach, such as a Monte Carlo based method. Using a Monte Carlo method, a large number of trials of calculations that vary market conditions that may occur in the future are typically performed. The greater the number of trials, the greater the accuracy of the Monte Carlo result.

The invention disclosed herein makes very fast, even near-real-time, evaluation of ASpBO feasible. Because the method described herein is an approximate one, the resulting NPV may differ from the actual NPV by a small percentage (typically a few basis points). In order to achieve a comparable precision using Monte Carlo based methods much more computational effort is needed. For instance, it is believed that on a one Giga-Hertz computer, the evaluation of one NPV calculation for an ASpBO having a given set of parameters would take some hours (i.e., about some ten thousand seconds) using a Monte Carlo method, but only some milliseconds when using an embodiment of a method of the invention described herein.

Moreover, the invention allows a proper handling of missing values of spot prices that should have been fixed in the past, i.e., unfixed spot prices $S_j(t_i^{(j)})$, where $t_i^{(j)} < t_E$.

It is understood that the Levy approach is for an option with only one underlying asset, with averaging of the spot price. While one could try to combine methods of determining price for basket options and methods for average spot options and could try to sequentially apply these methods, the results are not good. These are approximations and the determinations of the required approximations will have a strong impact on the price. While the modified Levy approach is also an approximation, it provides a price that has the highest surety when compared to models using the Monte Carlo method. While, in principal, one could achieve greater accuracy with Monte Carlo using a huge number of trials than with the modified Levy approach, the greater accuracy would come with a penalty of time, as each trial in a Monte Carlo simulation takes a finite amount of time.

It will be recognized that the Levy approximation is essentially this: If the spot price values $S_j(t_i)$ are log-normally distributed, the sum of these values is not log-normal. Nevertheless, the sum of these spot price values may have a distribution, which approximately corresponds to a log-normal one. The approach described herein uses a generalization of Levy. While Levy's approach relates to one underlying asset, the approach herein is generalized to use more than one underlying asset. From the generalization it follows that all correlations, not only between pairs of underlying assets, but also between pairs of underlying assets at distinct future instants are taken into account. The method disclosed herein may be realized through a modification to the boundary values of a Levy approximation, followed by an application of the Black-Scholes theory.

The main assumption of Levy's approach is, that the sum of future spot price values (i.e., the prices of the underlying asset at several future instants) are log-normally distributed. The extended assumption of the method disclosed herein is that the assumption holds also for the sum containing spot prices of more than one underlying asset.

In the Black-Scholes theory, it is assumed that the underlying asset is log-normally distributed. Black-Scholes theory, however, is derived for a single underlying asset. Herein, an assumption is made that is similar to the assumption used in the Black-Scholes theory, but the assumption is not just for one underlying asset but for the sum of spot prices of the underlying assets. The sum of spot prices may be treated as a new (in effect single) underlying asset to which the Black-Scholes theory is applied. Therefore, as used herein, the basic assumption is that the double sum $$\sum_{j=1}^{N_A} \sum_{i=1}^{N_j} w_i^{(j)} S_j(t_i^{(j)})$$

of the spot prices of the underlying assets at certain instants can be approximately treated as being log-normally distributed. Then, the double sum may be viewed as the spot price of an imaginary underlying asset (i.e., the new underlying asset described above). If the parameters ($1^{st}$ and $2^{nd}$ moment) of the approximate log-normal distribution are known, the Black-Scholes theory can be applied.

Figure 2:
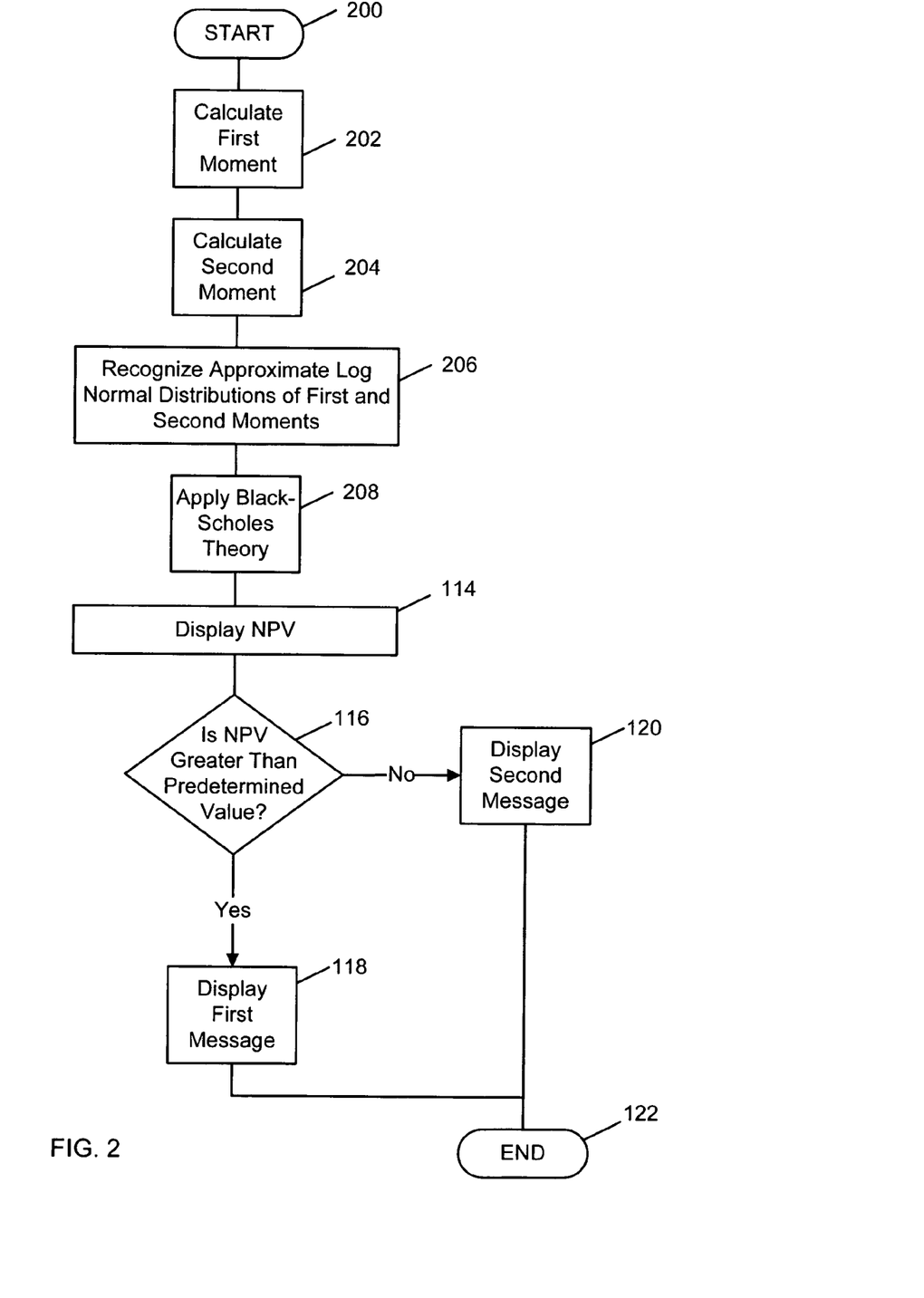
FIG. 2 is a flow diagram of a method in accordance with an embodiment of the invention.

FIG. 2 is a flow diagram of a method described herein, in accordance with an embodiment of the invention. The method of FIG. 2 starts at step 200. At step 202, a first moment of a sum of spot price values $S_j(t_i^{(j)})$ of the underlying assets of a basket, at certain instants of time, may be calculated. The first moment may be expressed by the formula of Eqn. 7, shown above. At step 204, a second moment of the sum of spot price values $S_j(t_i^{(j)})$ of the underlying assets of the basket at certain instants of time may be calculated. The second moment may be expressed by the formula of Eqn. 8, shown above. In accordance with the method of the invention, at step 206, the first and second moments may be taken as parameters describing an approximate log-normal distribution. At step 208, Black-Scholes theory may be applied to the first and second moments to determine an NPV. Following step 208, the method may further include steps 114 to 122, as described in connection with FIG. 1.

There is no closed form solution for pricing ASpBOs, BOs, or ASpOs. Acceptable approximative solutions should exhibit errors below some few basis points for usual applications. The approach described herein generalizes a Levy approach to ASpBOs. The Levy approach is intended for ASpOs, see, e.g., David F. DeRosa: *Currency Derivatives: Pricing Theory, Exotic Options, and Hedging Applications*, John Wiley & Sons, Inc. NY (1998).

One example of a use of the disclosed invention relates to the hedging of incoming foreign cash flows. Average spot basket options or particularly average rate foreign exchange ("FX") basket options can be used to hedge incoming foreign cash flows, where the cash flows are flowing periodically (e.g., once a week). The hedge can reduce the impact of fluctuating FX rates. The expected losses can be bounded. A determination of an NPV for the ASpBO is a prerequisite for calculating the hedge effectiveness or the Value at Risk ("VaR") of the hedged portfolio. The method and system disclosed herein for calculating NPV may allow a user to quickly and accurately, in comparison to known previously used methods, determine NPV. The determination of NPV can be done in, for example, within less than 1 second and yield a good approximation of the NPV. It is believed that it would take several hours on a PC to get the NPV with the same accuracy by using a Monte Carlo method.

Another example of a use of the disclosed invention, which includes weights and individual schedules with non-equidistant fixing dates is as follows:

Consider a company, which buys energy (electric power and oil) for its current consumption. The company must pay for its electric power consumption on a daily basis according to its actual daily consumption. Each Friday the company receives an oil delivery and the company must pay for the oil on each following Monday.

The prices for electric power and oil are based on current market quotations. The company wants to have insurance, that it will not have to pay more than $0.12/kWh of electric power and not more than $0.55/liter (ltr.) of oil on average. Therefore, the company buys a call-ASpBO for the four week period from Oct. 4 to 31, 2004. The expected electric power consumption is 100,000 kWh in total for this period. There is no consumption on Sundays and on Fridays and Saturdays there is only half of that on the other days of the week. Therefore, the electric power schedule appears as follows:

| Day | | Electric Power | Percentage | Weight |
|---|---|---|---|---|
| Oct/4 | Monday | 5,000 kWh | 5.0% | 0.05 |
| Oct/5 | Tuesday | 5,000 kWh | 5.0% | 0.05 |
| Oct/6 | Wednesday | 5,000 kWh | 5.0% | 0.05 |
| Oct/7 | Thursday | 5,000 kWh | 5.0% | 0.05 |
| Oct/8 | Friday | 5,000 kWh | 2.5% | 0.025 |
| Oct/9 | Saturday | 5,000 kWh | 2.5% | 0.025 |
| Oct/11 | Monday | 5,000 kWh | 5.0% | 0.05 |
| Oct/12 | Tuesday | 5,000 kWh | 5.0% | 0.05 |
| Oct/13 | Wednesday | 5,000 kWh | 5.0% | 0.05 |
| Oct/14 | Thursday | 5,000 kWh | 5.0% | 0.05 |
| Oct/15 | Friday | 5,000 kWh | 2.5% | 0.025 |
| Oct/16 | Saturday | 5,000 kWh | 2.5% | 0.025 |
| Oct/18 | Monday | 5,000 kWh | 5.0% | 0.05 |
| Oct/19 | Tuesday | 5,000 kWh | 5.0% | 0.05 |
| Oct/20 | Wednesday | 5,000 kWh | 5.0% | 0.05 |
| Oct/21 | Thursday | 5,000 kWh | 5.0% | 0.05 |
| Oct/22 | Friday | 5,000 kWh | 2.5% | 0.025 |
| Oct/23 | Saturday | 5,000 kWh | 2.5% | 0.025 |
| Oct/25 | Monday | 5,000 kWh | 5.0% | 0.05 |
| Oct/26 | Tuesday | 5,000 kWh | 5.0% | 0.05 |
| Oct/27 | Wednesday | 5,000 kWh | 5.0% | 0.05 |
| Oct/28 | Thursday | 5,000 kWh | 5.0% | 0.05 |
| Oct/29 | Friday | 5,000 kWh | 2.5% | 0.025 |
| Oct/30 | Saturday | 5,000 kWh | 2.5% | 0.025 |
| Total: Oct | | 100,000 kWh | 100.0% | 1.000 |

The oil schedule appears as follows:

| Day | | Oil | Percentage | Weight |
|---|---|---|---|---|
| Oct/4 | Monday | 15,000 ltr. | 30% | 0.3 |
| Oct/11 | Monday | 10,000 ltr. | 20% | 0.2 |
| Oct/18 | Monday | 12,500 ltr. | 25% | 0.25 |
| Oct/25 | Monday | 12,500 ltr. | 25% | 0.25 |
| Total: Oct | | 50,000 ltr. | 100% | 1.00 |

The strike price calculates as follows:

$$\text{Strike Price} = 100,000 \text{kWh} \times \$0.12/\text{kWh} +$$
$$50,000 \text{ ltr.} \times \$0.55/\text{ltr.}$$
$$= \$12,000 + \$27,500$$
$$= \$39,500.$$

The example above illustrates two schedules with their corresponding weighting factors, non-equidistant fixing dates, and a strike price, i.e., the main parameters of an option contract.

FIG. 3 illustrates an exemplary embodiment of a derivatives pricing system 300 in accordance with an embodiment of the invention. Derivatives pricing system 300 may be a computer system comprising a processor 304 and a memory 302, the memory 302 containing instructions to be executed in accordance with a method of an embodiment of the invention. In some embodiments, the system 300, may include a memory 302, a controller or processor 304, a network interface 306, an input device 308, an output device 310, a database interface 312, all coupled to bus 314. While the diagram of FIG. 3 illustrates the exemplary items 302 through 312 as being coupled to a common bus 314, nothing herein should be construed as requiring the exemplary items 302 through 312 to be collocated or even to be restricted to use of a common bus 314.

Figure 4:
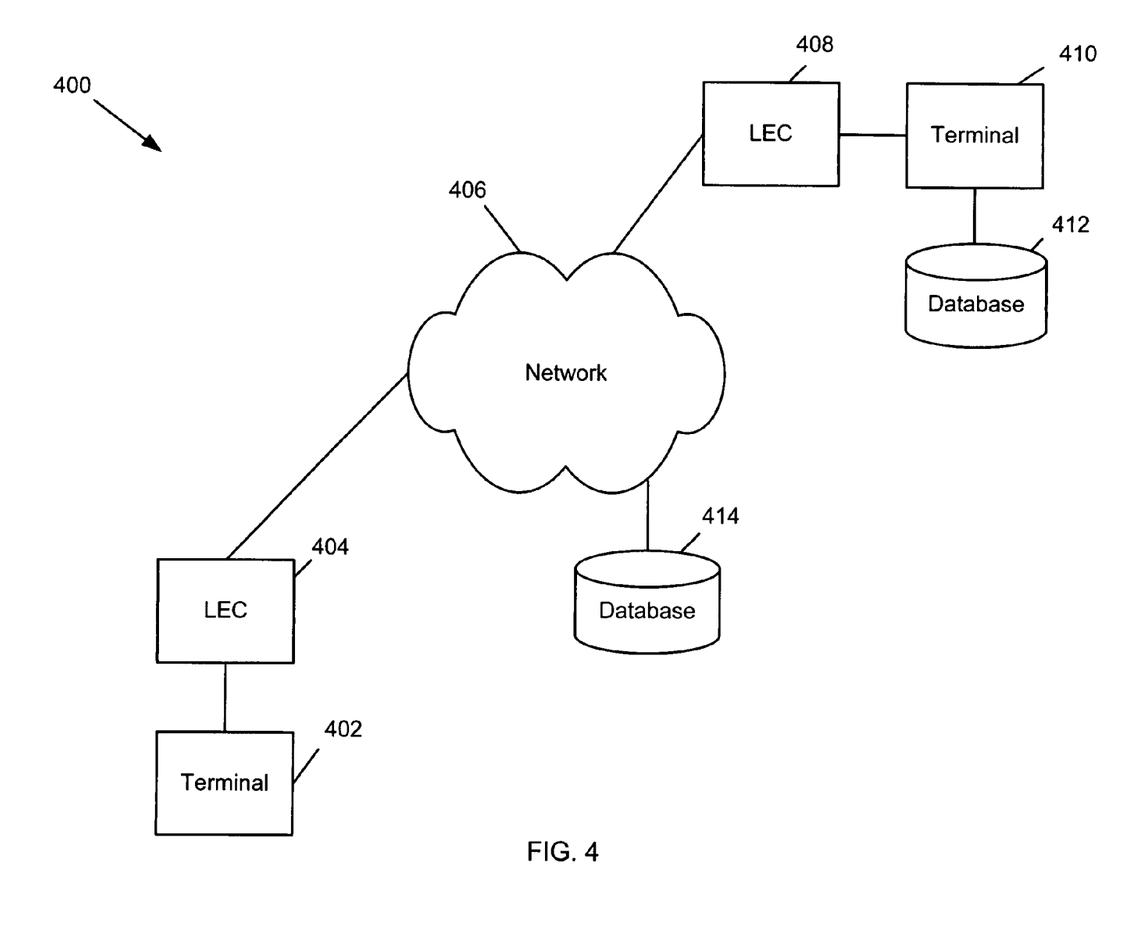
FIG. 4 illustrates a system suitable for practicing an embodiment of the invention.

Computer readable memory 302 may store computer program code which, when executed by a processor or controller 304 implements the functionality for this embodiment of the invention. The memory 302 may be any memory including, for example, static or dynamic random access memory, or flash memory. Memory 302 may store an operating system in addition to any instructions required to perform a method in accordance with an embodiment of the invention. Memory 302 may also be used to store market and/or contract data, but such market and/or contract data may alternatively or additionally be stored in an alternative location, such as a data storage device such as, for example, a hard disk, CD-ROM, or tape drive. Market and/or contract data may alternatively or additionally be stored in an alternative location, such as in a database 412, 414 (FIG. 4).

The controller or processor 304 may run executable code and process instructions required to perform a method in accordance with an embodiment of the invention. The controller or processor 304 need not be dedicated to running such executable code or processing such instructions and may additionally be used for other applications. For example, the controller 304 may be used to perform an e-mail application.

The network interface 306 may, for example, be any sort of data transmission or receiving device, such as a modem, a network interface card, wireless device or a telephone line transceiver. The network interface 306 operatively couples a communications network 406 (FIG. 4) to the controller 304 via common bus 314 and possibly other intermediary nodes such as, for example, local exchange carriers (LEC) 404, 408 (FIG. 4).

An input device 308, such as a keyboard or any type of data input unit, may be included in the system 300. An output device 310 may include any device or combination of devices that convert electrical signals to, for example, video images or printed images, where "images" may include textual representations of results of a method in accordance with the invention. The output device 310 may be located with the system 300, but may alternatively be located remotely from the system 300. Output device 310 may be coupled to controller 304 (and bus 314) via, for example, wireline, wireless, radio frequency, infrared, or optical links.

The database interface 312 provides an interface that couples the system 300 to a database 412, 414 (FIG. 4) to give the controller 304 access to data including, for example, market data and/or contract data.

FIG. 4 illustrates a system suitable for practicing an embodiment of the invention. FIG. 4 illustrates an exemplary embodiment of a derivatives pricing system 400 that includes a communications network 406 coupled to several terminals, here exemplified by terminals 402 and 410, via local exchange carriers ("LECs") 404 and 408, respectively. Databases 412 and 414 are also included in the exemplary embodiment of the derivatives pricing system 400. In the exemplary embodiment of FIG. 4, terminals 402 and 410 each are capable of executing computer code embodying a method in accordance with the invention.

A first database 412 is illustrated as being coupled to terminal 410. Such coupling may be, for example, via a direct connection or via a local area network. A second database 414 is illustrated as being coupled to the network 406. Either terminal 404 or terminal 410 or both may access the second database 414. The databases 412 and 414 may be stored on appropriate medium of any memory device such as, for example, memory 302 of FIG. 3. The medium may include, for example, solid state memory, optical memory, and/or magnetic memory. The databases 412 and/or 414 may each be referred to as a subscriber database as they may contain data that may be unique to an individual subscriber.

The communications network 406 may be may be any type of network that carries communications including, for example, a public switched telephone network, the Internet, an intranet, a local area network (LAN), a wide area network (WAN), or any combination of communication and/or data-bearing networks including wireless networks.

The terminals 402, 410 may be, for example, personal computers or wireless devices capable of executing computer code in accordance with an embodiment of the invention. Any combinations of terminals are within the scope of the invention.

System 400 may include a machine-readable medium, such as memory having stored thereon a plurality of executable instructions, the plurality of instructions comprising instructions to read an evaluation date, contract data associated with a basket, market data, as a function of the evaluation date, for each of the underlying assets of the basket, and calculate the net present value of the average spot basket option by application of Black-Scholes theory to the sum of spot prices of the underlying assets of the basket, wherein the sum of spot prices of the underlying assets of the basket is represented as a single underlying asset for the purpose of the application of Black-Scholes theory.

Figure 5:
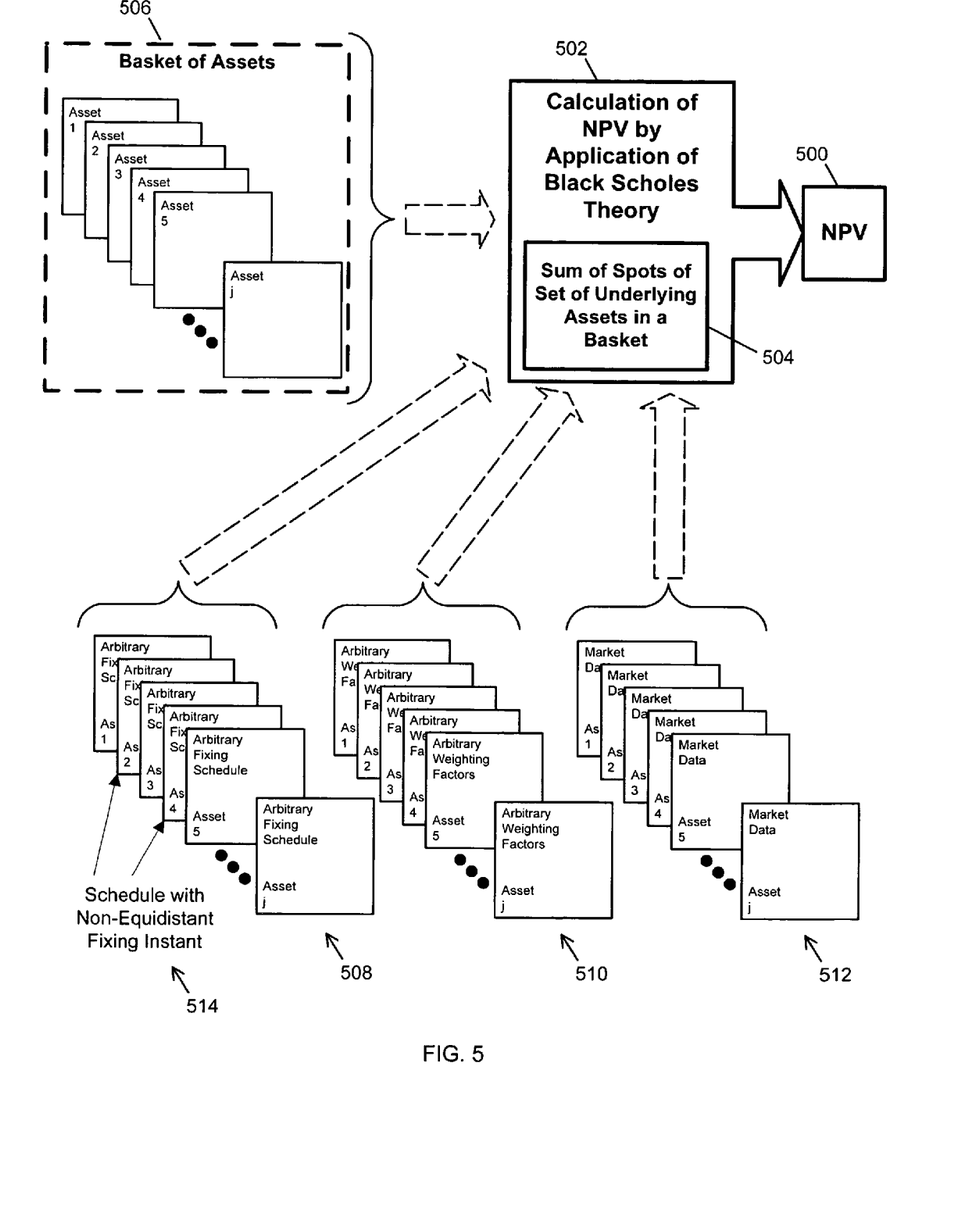
FIG. 5 is a conceptual flow diagram of a method in accordance with an embodiment of the invention.

FIG. 5 is a conceptual flow diagram of a method in accordance with an embodiment of the invention. A value of NPV 500 is illustrated as resulting from a calculation that includes an application of Black Scholes theory 502 to a sum of spots of a set of underlying assets in a basket 504. The basket of assets 506 may be represented as Asset 1 to Asset j, where j is the number of assets in the basket 506. Data that may be used in a calculation of NPV 500 is illustrated as including arbitrary fixing schedules for assets in the basket 508, arbitrary weighting factors for assets in the basket 510, and market data for assets in the basket 512. As illustrated in FIG. 5, a plurality of arbitrary fixing schedules may include schedules with non-equidistant fixing instants 514.

The disclosed embodiments are illustrative of the various ways in which the present invention may be practiced. Other embodiments can be implemented by those skilled in the art without departing from the spirit and scope of the present invention.

What is claimed is:

1. A computer-implemented method of determining a net present value of one of a call and a put ("$V_{call}$" and "$V_{put}$" respectively) of an average spot basket option as a function of an evaluation date, comprising:

reading, by a processor, an evaluation date;

reading, by the processor, contract data for a set of assets belonging to a basket;

reading, by the processor, market data, as a function of the evaluation date, for the set of assets belonging to the basket;

calculating, by the processor, the net present value according to the following equations:

$$\begin{rcases} V_{call}(t_E) = e^{-r(t_E,T)(T-t_E)}\left[+\tilde{F}N(+\tilde{d}_1) - \tilde{K}N(+\tilde{d}_2)\right] \\ V_{put}(t_E) = e^{-r(t_E,T)(T-t_E)}\left[-\tilde{F}N(-\tilde{d}_1) + \tilde{K}N(-\tilde{d}_2)\right] \end{rcases} \begin{array}{l} \text{for } t_E \le T \text{ and} \\ \tilde{K} > 0 \end{array}$$

$$\begin{rcases} V_{call}(t_E) = e^{-r(t_E,T)(T-t_E)}\left[+\tilde{F} - \tilde{K}\right] \\ V_{put}(t_E) = 0 \end{rcases} \begin{array}{l} \text{for } t_E \le T \text{ and} \\ \tilde{K} \le 0 \end{array}$$

$$V_{call/put}(t_E) = 0, \quad \text{for } t_E > T$$

where $$\tilde{d}_1 = \frac{\ln\frac{\tilde{F}}{\tilde{K}}}{v} + \frac{v}{2}, \tilde{d}_2 = \tilde{d}_1 - v$$

$$\tilde{K} = K - \sum_{j=1}^{N_A}\sum_{i=1}^{N_j}\left(1 - \delta_i^{(j)}\right) \times w_i^{(j)} S_j\left(t_i^{(j)}\right)$$

where $\delta_i^{(j)} = \begin{cases} 0, & \text{if } S_j(t_i^{(j)}) \text{ is already fixed} \\ 1, & \text{if } S_j(t_i^{(j)}) \text{ is not yet fixed} \end{cases}$ $\tilde{F} = \langle M \rangle$ $v^2 = \ln\langle M^2 \rangle - 2\ln\langle M \rangle$ $$\langle M \rangle = \sum_{j=1}^{N_A} S_j(t_E) \sum_{i=1}^{N_j} \delta_i^{(j)} \times w_i^{(j)} e^{g_j\left(t_i^{(j)} - t_E\right)}$$

$$\langle M^2 \rangle = \sum_{j=1}^{N_A}\sum_{j'=1}^{N_A} S_j(t_E) S_{j'}(t_E) \sum_{jj'}$$

$$\sum_{jj'} = \sum_{i=1}^{N_j} \delta_i^{(j)} \times w_i^{(j)} e^{g_j\left(t_i^{(j)} - t_E\right)} \times \sum_{i'=1}^{N_{j'}} \delta_{i'}^{(j')} \times w_{i'}^{(j')} e^{g_{j'}\left(t_{i'}^{(j')} - t_E\right)} \times e^{\rho_{jj'} \sigma_j \sigma_{j'} \tau_{ii'}^{(jj')}}$$

$g_j = r(t_E, T) - q_j(t_E, T), j = 1, \ldots, N_A$ $$\tau_{ii'}^{(jj')} = \begin{cases} 0, & \text{if } (t_i^{(j)} - t_E) \times (t_{i'}^{(j')} - t_E) < 0 \\ \text{Min}\{\text{Abs}(t_i^{(j)} - t_E), \text{Abs}(t_{i'}^{(j')} - t_E)\}, & \text{else} \end{cases}$$

where
N(x) represents a normal cumulative distribution
$r(t_1,t_2)$ represents a riskless domestic currency interest rate for the time span $t_1 \ldots t_2$
$q_j(t_1,t_2)$ represents a dividend rate, or foreign currency interest rate for the time span $t_1 \ldots t_2$
$S_j(t)$ represents a spot price of the j-th underlying asset, $j=1, \ldots, N_A$
$\sigma_j$ represents a volatility of the j-th underlying asset
$\rho_{jj'}$ represents a correlation coefficient between the assets j and j' (the correlation is related to the logarithm of the asset prices)
K represents a strike price
$t_E$ represents an evaluation date (unit of measure is year)

$$T = \text{Max}_{i,j}\{t_i^{(j)}\}$$

represents a latest fixing instant, i.e., the maturity at option
$w_i^{(j)}$ represents an i-th weighting factor of j-th asset; and
displaying the calculated net present value on a display device.

2. The method of claim 1, wherein the evaluation date is the date for which the net present value is calculated.

3. The method of claim 1, wherein contract data comprises identities of the underlying assets, amounts of the underlying assets, an indication of whether there is a call or a put on the basket of underlying assets, a strike price of the underlying assets, and a timetable or schedule as to when the spot price values should be fixed in order to get their average.

4. The method of claim 1, wherein market data comprises a spot price value for each underlying asset valid at the evaluation date, an interest rate curve of the contract currency, one volatility for each underlying asset, and a correlation between all the underlying assets.

5. The method of claim 1, wherein calculating employs arbitrary fixing schedules for a plurality of underlying assets in the basket.

6. The method of claim 1, wherein calculating employs non-equidistant fixing instants within a fixing schedule.

7. The method of claim 1, wherein calculating employs arbitrary weighting factors for a plurality of underlying assets in the basket.

8. The method of claim 1, wherein the method is a non-Monte Carlo method.

9. The method of claim 1, further comprising:
displaying a first message if the net present value is greater than a predetermined value; and
displaying a second message if the net present value is less than a predetermined value.

* * * * *